(12) United States Patent
Bernal et al.

(10) Patent No.: US 9,213,900 B2
(45) Date of Patent: Dec. 15, 2015

(54) AUTOMATED VISION-BASED CLUTTER DETECTOR AND NOTIFIER

(71) Applicant: Xerox Corporation, Norwalk, CT (US)

(72) Inventors: Edgar A. Bernal, Webster, NY (US);
Robert P. Loce, Webster, NY (US);
Wencheng Wu, Webster, NY (US)

(73) Assignee: XEROX CORPORATION, Norwalk, CT (US)

(*) Notice: Subject to any disclaimer, the term of this patent is extended or adjusted under 35 U.S.C. 154(b) by 190 days.

(21) Appl. No.: 13/911,105

(22) Filed: Jun. 6, 2013

(65) Prior Publication Data

US 2014/0363043 A1    Dec. 11, 2014

(51) Int. Cl.
*G06K 9/00* (2006.01)

(52) U.S. Cl.
CPC .................. *G06K 9/00771* (2013.01)

(58) Field of Classification Search
USPC .................................................. 382/103, 181
See application file for complete search history.

(56) References Cited

U.S. PATENT DOCUMENTS

| | | |
|---|---|---|
| 5,465,115 A | 11/1995 | Conrad et al. |
| 5,581,625 A | 12/1996 | Connell |
| 5,953,055 A | 9/1999 | Huang et al. |
| 6,195,121 B1 | 2/2001 | Huang et al. |
| 6,654,047 B2 | 11/2003 | Iizaka |
| 7,688,349 B2 | 3/2010 | Flickner et al. |
| 8,325,036 B1 * | 12/2012 | Fuhr et al. ............. 340/540 |
| 2005/0185834 A1 * | 8/2005 | Kristjansson et al. ...... 382/154 |
| 2007/0127774 A1 * | 6/2007 | Zhang et al. ............. 382/103 |
| 2010/0134624 A1 * | 6/2010 | Bobbitt et al. ........... 348/150 |

OTHER PUBLICATIONS

"Markerless camera pose estimation—an overview", T. Noll et al., in Proc. of Visualization of Large and Unstructured Data Sets, Mar. 19-21, Bodega Bay, CA, 2010.
"A taxonomy and evaluation of dense two-frame stereo correspondence algorithms", D. Scharstein and R. Szeliski, International Journal of Computer Vision, vol. 47(I), pp. 7-42, 2002.
"Recovering surface layout from an image", D. Hoiem et al., International Journal of Computer Vision, vol. 75(I), pp. 151-172, 2007.

* cited by examiner

*Primary Examiner* — Amara Abdi
(74) *Attorney, Agent, or Firm* — Fay Sharpe LLP

(57) ABSTRACT

A system and method of monitoring a customer space including obtaining visual data comprising image frames of the customer space over a period of time, defining a region of interest within the customer space, the region of interest corresponding to a portion of the customer space in which customers relocate objects, monitoring the region of interest for at least one predefined clutter condition, and generating a notification when the at least one predefined clutter condition is detected.

17 Claims, 11 Drawing Sheets

AUTOMATED VISION-BASED CLUTTER DETECTOR AND NOTIFIER

BACKGROUND

Advances and increased availability of surveillance technology over the past few decades have made it increasingly common to capture and store video footage of retail settings for the protection of companies, as well as for the security and protection of employees and customers. This data has also been of interest to retail markets for its potential for data-mining and estimating consumer behavior and experience. For some large companies, slight improvements in efficiency or customer experience can have a large financial impact.

Several efforts have been made at developing retail-setting applications for surveillance video beyond well-known security and safety applications. For example, one such application counts detected people and records the count according to the direction of movement of the people. In other applications, vision equipment is used to monitor queues, and/or groups of people within queues. Still other applications attempt to monitor various behaviors within a reception setting.

One industry that is particularly heavily data-driven is fast food restaurants. Accordingly, fast food companies and/or other restaurant businesses tend to have a strong interest in numerous customer and/or store qualities and metrics that affect customer experience, such as dining area cleanliness, table usage, queue lengths, experience time in-store and drive-through, specific order timing, order accuracy, and customer response.

BRIEF DESCRIPTION

Aspects of the present disclosure set forth an exemplary vision-based system for automatically detecting regions or areas of a customer space that need service or other action and notifying personnel so that action can be taken as soon as possible. The system can operate on widely deployed existing surveillance camera networks. In some embodiments the customer space includes a dining table. It will be appreciated that the customer space can additionally or alternatively include floors, counters, walkways, and/or virtually any other space in which it may be desirable to automatically detect and notify personnel of a certain condition.

In accordance with one aspect, a method of monitoring a customer space comprises obtaining visual data comprising image frames of the customer space over a period of time, defining a region of interest within the customer space, monitoring the region of interest for at least one predefined clutter condition, and generating a notification when the at least one predefined clutter condition is detected.

The region of interest can correspond to a portion of the customer space in which customers relocate objects, and the predefined clutter condition can include at least one of detecting a presence of relocated objects in the region of interest, or a sustained presence or absence of motion in the region of interest. The detecting a presence of relocated objects can include defining a background space and detecting the appearance of foreground objects. The detecting a presence of relocated objects can include analyzing the visual data with an object detection algorithm configured to identify specific objects within the region of interest. The object detection algorithm can be configured to detect objects including at least one of dining objects, litter, spilled liquids or other substances, or personal accessories. The predefined clutter condition can include the presence of relocated objects in the region of interest and the absence of motion in the region of interest for a prescribed period of time. The prescribed period of time can be at least ten seconds. Obtaining visual data can include recording images with a camera. Defining a region of interest can be performed manually by selecting the region of interest in a video frame with an input device. Defining a region of interest can include using computer vision techniques to locate an elevated surface corresponding to a dining surface. The computer vision techniques can include at least one of sensing horizontal support surfaces or generating a depth map using stereo vision techniques.

In accordance with another aspect, a non-transitory computer-readable medium having stored thereon computer-executable instructions for monitoring a customer space, the instructions being executable by a processor and comprise receiving optical data of the customer space over a period of time, defining a region of interest within the customer space, the region of interest corresponding to a portion of the customer space in which customers periodically relocate objects, monitoring the region of interest for at least one predefined clutter condition, and generating a notification when the at least one predefined clutter condition is detected.

The predefined clutter condition can include at least one of detecting a presence of relocated objects in the region of interest, or a sustained presence or absence of motion in the region of interest. The detecting a presence of relocated objects can include defining a background space and detecting the appearance of foreground objects. The detecting a presence of relocated objects can include analyzing the visual data with an object detection algorithm configured to identify specific objects within the region of interest. The object detection algorithm can be configured to detect objects including at least one of dining objects or personal accessories.

In accordance with another aspect, a system for monitoring a customer space comprises at least one optical sensor for obtaining optical data corresponding to the customer space, and a central processing unit including a processor and a non-transitory computer-readable medium having stored thereon computer-executable instructions for monitoring a customer space executable by the processor, the instructions comprising receiving optical data of the customer space over a period of time from the optical sensor, defining a region of interest within the customer space, the region of interest corresponding to a portion of the customer space in which customers periodically relocate objects, monitoring the region of interest for at least one predefined clutter condition and generating a notification when the at least one predefined clutter condition is detected.

The predefined clutter condition can include at least one of detecting a presence of relocated objects in the region of interest, or a sustained presence or absence of motion in the region of interest. The detecting a presence of relocated objects can include analyzing the visual data with an object detection algorithm configured to identify specific objects within the region of interest. The detecting a presence of relocated objects can include analyzing the visual data with an object detection algorithm configured to identify specific objects within the region of interest.

DETAILED DESCRIPTION

Figure 1:
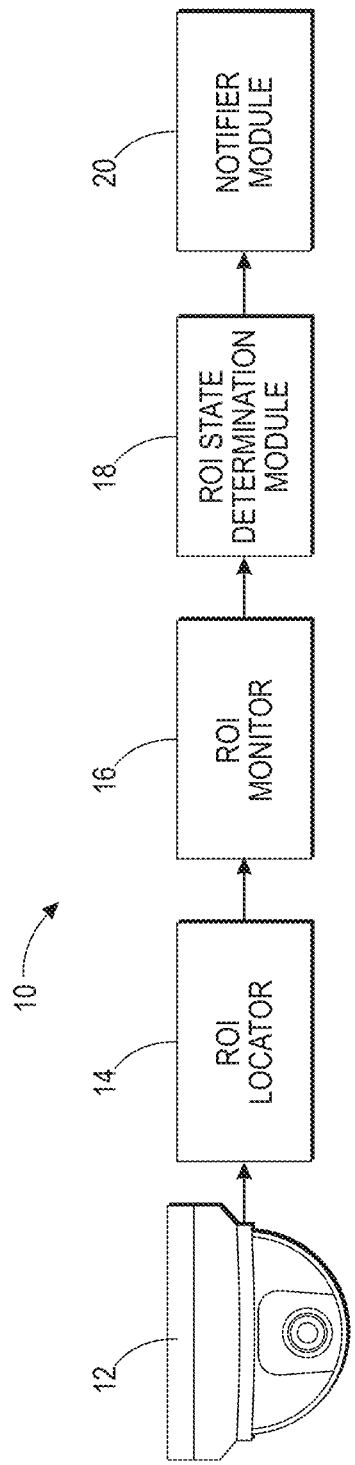
FIG. 1 is a block diagram of an exemplary system in accordance with the present disclosure.

A system 10 in accordance with the present disclosure comprises a plurality of modules, illustrated schematically in FIG. 1. The system 10 includes a video capture module 12 that acquires visual data (e.g., video frames or image frames) of a dining area being monitored for cleanliness. A region of interest (ROI) locator module 14 determines pixel locations of areas within the visual data that correspond to one or more areas of interest such as dining tables, chairs, booths, and/or floors, etc. An ROI monitoring module 16 determines the presence of clutter (including but not limited to objects such as utensils, plates, trays, glasses, personal accessories, spilled liquids and/or other materials, etc.) that are commonly relocated by dining customers and then left behind in the ROI. An ROI state determination module 18 is provided for determining whether the ROI is in a normal (e.g., no need for cleaning), potential cleaning (e.g., cleaning may be required pending verification) or cleaning state (e.g., cleaning required). A notifier module 20 issues a notification to a restaurant employee when the ROI or portions of it are deemed by the ROI state monitoring module 18 to be cluttered or in need of cleaning.

In an exemplary embodiment, the video capture module 12 can comprise at least one surveillance camera that captures video of an area including the ROI. No special requirements in terms of spatial or temporal resolutions are needed for most applications. Traditional surveillance cameras are typically IP cameras with pixel resolutions of VGA (640×480) and above and frame rates of 15 fps and above. Such cameras are generally well-suited for this application. Higher resolution cameras can also be utilized, as well as cameras having other capabilities such as IR and thermal imaging cameras, for example.

Figure 2:
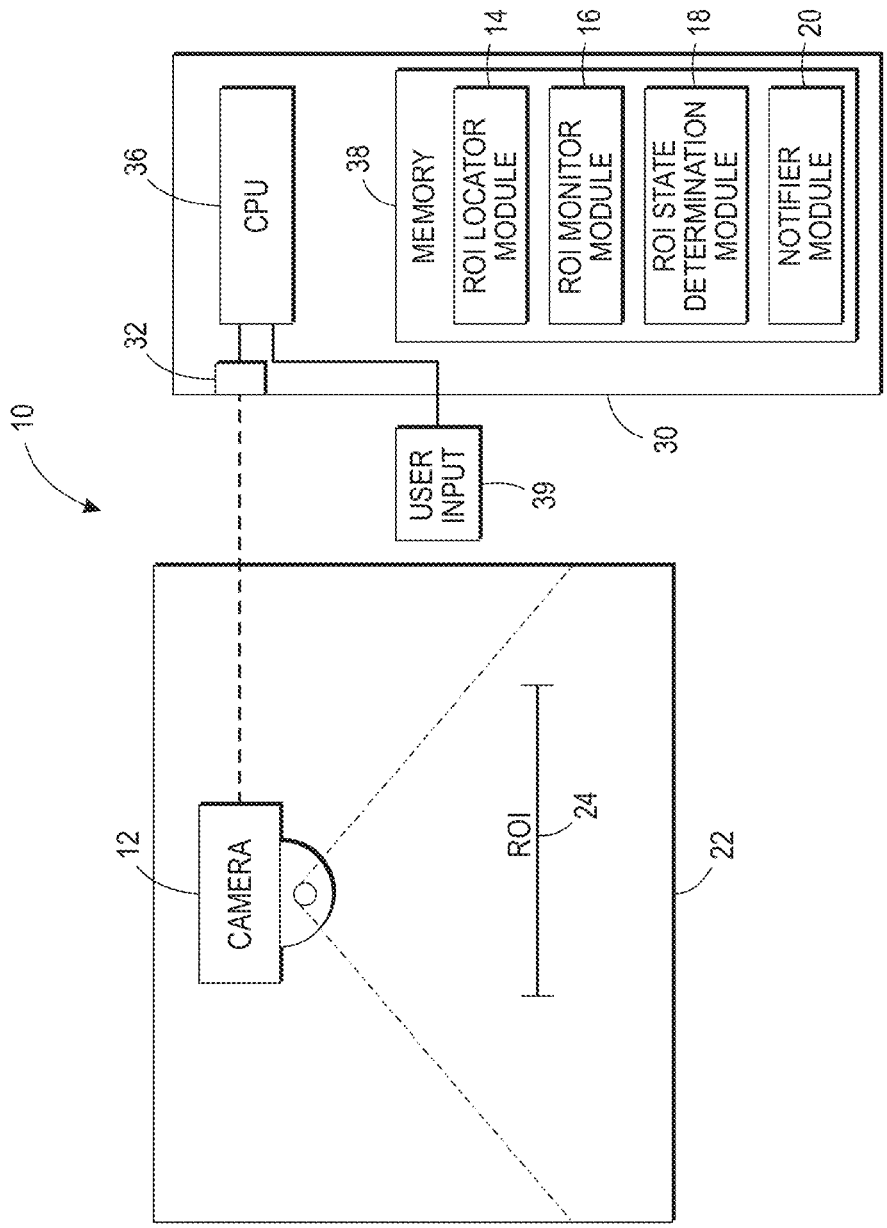
FIG. 2 is a block diagram of another exemplary system in accordance with the present disclosure.

In FIG. 2, the exemplary system 10 is illustrated in block diagram form in connection with a retail space 22 having at least one ROI 24. It will be appreciated that video capture module 12 is a camera (e.g., an existing surveillance camera) mounted in a location for monitoring the retail space 22. The ROI 24 comprises a portion of the monitored space. As will be described below, various methods can be implemented for determining the ROI 24.

The video capture module 12 is connected to a computer 30 and supplies visual data comprising one or more image frames thereto via a communication interface 32. It will be appreciated that the computer 30 can be a standalone unit configured specifically to perform the tasks associated with the aspects of this disclosure. In other embodiments, aspects of the disclosure can be integrated into existing systems, computers, etc. The communication interface 32 can be a wireless or wired communication interface depending on the application. The computer 30 further includes a central processing unit 36 coupled with a memory 38. Stored in the memory 38 are the ROI locator module 14, the ROI monitor module 16, ROI state determination module 18 and the notifier module 20. Visual data received from the video capture module 12 can be stored in memory 38 for processing by the CPU 36 in accordance with this disclosure.

Figure 3:
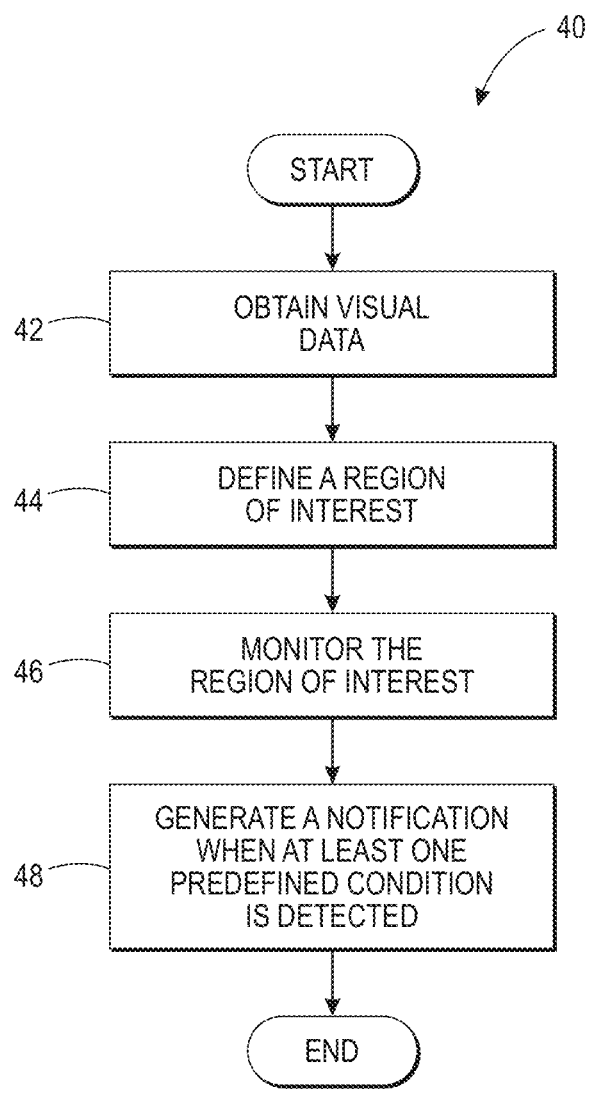
FIG. 3 is a flow chart illustrating an exemplary method in accordance with the present disclosure.

With reference to FIG. 3, a method in accordance with the present disclosure is identified generally by reference numeral 40. The method begins with process step 42 wherein visual data comprising one or more image frames of a customer space over a period of time are obtained. As noted, this data can be obtained using surveillance cameras or the like. In process step 44, a region of interest (ROI) is defined within the customer space. The region of interest corresponds to a portion of the customer space in which customers relocate objects such as utensils, plates, cups, etc.

In process step 46, the ROI is monitored for at least one predefined clutter condition. A predefined clutter condition can be the presence of clutter such as plates, cups, etc. which indicates that a customer has relocated an item to the ROI. Motion or the absence of motion within and/or near the ROI indicates that a customer remains in the region of interest, or has possibly left the ROI. In the final process step 48, a notification is generated when at least one predefined clutter condition is detected.

Figure 4:
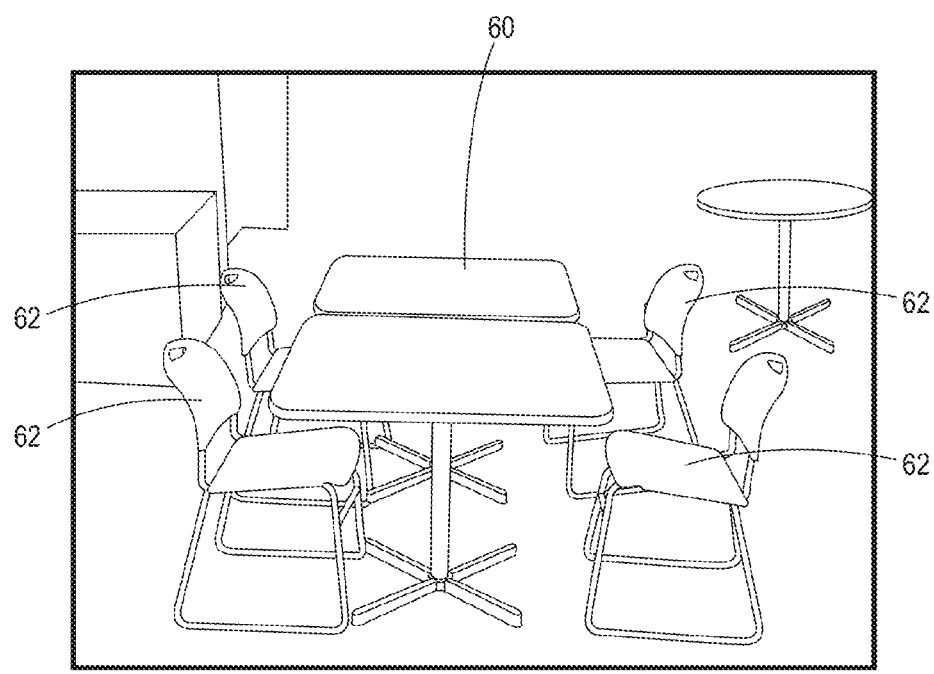
FIG. 4 is an image frame including an exemplary region of interest.

Turning to the remaining FIGURES, and initially to FIG. 4, the method of the present disclosure will be described in connection with a plurality of image frames. In FIG. 4, a sample video frame captured with the video camera 12 is shown including a dining space. The dining space includes a table 60 and a plurality of chairs 62. The ROI locator module 14 determines the pixel locations of areas within the visual data that correspond to dining tables, or, more generally, to any ROI that has to be monitored for cleanliness (or another desired parameter). The exemplary embodiment focuses on monitoring of the dining table 60 for items left behind by customers. Alternative embodiments can include monitoring of other types of ROI such as floors, chairs, booths, condiment tables, benches, etc. It will be appreciated that the ROI locator module 14 utilizes input video or still image frames acquired with the video capture module 12 to accurately set the ROI.

In accordance with this disclosure, there are several possible exemplary options to achieve ROI localization. In one example, the location of the ROI is manually set by an operator. This approach includes having a camera operator or restaurant employee manually input the pixel coordinates of polygons outlining the areas of interest via a mouse, a touch screen or some other input device. An input device 39 is illustrated in FIG. 2 for such purposes. For example, a mouse can be provided for allowing a user to select an ROI. In another example, a touchscreen may be provided whereon the image frame is shown, and a user can select the ROI directly with the touchscreen by outlining the ROI.

Another approach to set the ROI includes utilizing computer vision techniques. For example, automated computer vision solutions based on analysis of monocular still images of the monitored area, such as the one shown in FIG. 4, can be applied. In an exemplary embodiment, an approach can include automatically classifying the layout of surfaces in a scene into 'support' (i.e., horizontal) and 'vertical' surfaces. Once the locations of horizontal surfaces have been identified, template matching techniques between the located areas and expected table shapes (e.g., square, rectangular, circular, elliptical, trapezoidal, etc) can be applied. Alternatively, shape identification techniques, such as Hough and Extended Hough transforms can be applied to further enhance identification of appropriate ROI's.

It should be appreciated that the size of the search space for matching shapes can be dramatically reduced if the location and angle of the camera are known or estimated. Once the specifications of the camera pose are known, the sets of parametric shape representation describing the appearance of tables can be computed by applying the homographic transformation that relates pixel coordinates to real-world coordinates (and vice-versa) to traditional shapes of tables (e.g., square, rectangular, circular, etc).

For example, a typical camera model that relates pixel coordinates (i,j) to real-world 3D coordinates (X,Y,Z) is a homographic (or projective) transformation, as shown in Eq. (1) below. A straight-forward method to determine the parameters of the transformation is by solving a set of simultaneous equations provided by a set of points (i,j)'s in the image for which their corresponding (X,Y,Z) coordinates are known. Without loss of generality, and assuming the horizontal plane is perpendicular to one of the (X,Y,Z) cardinal axes, say Z, and knowing that a portion of pixels correspond to the image of a horizontal plane (e.g. table) at some height (Z=h), then the distance (depth) and distance variation of those pixels can be used to determine the camera pose via the homographic transformation expression.

$$Z_c \begin{bmatrix} i \\ j \\ 1 \end{bmatrix} = KR \begin{bmatrix} X \\ Y \\ Z \end{bmatrix} + K \begin{bmatrix} t_X \\ t_Y \\ t_Z \end{bmatrix} \quad (1)$$

Here, K is a 3×3 matrix uniquely determined by camera intrinsic parameters, R represents camera rotation, $[t_X t_Y t_Z]^T$ represent camera translation, $Z_c$ is an unknown scaling representing the distance from the object point to camera center (the depth dimension in an RGB-D data set). Note that K can be determined offline via standard camera calibration procedures. Assuming no spatial distortion, K has the form shown in Eq. (2), where $f_i$'s are focal lengths in two directions, α represents the sensor skew (if non-zero), and $c_i$'s are camera center positions, in pixels. R and $[t_X t_Y t_Z]^T$ represent the camera pose that needs to be measured every time the relative position of the camera to the reference real-world coordinates changes. $Z_c$ needs to be estimated for every object point (i,j) unless the sensor provides depth measurement.

$$K = \begin{bmatrix} f_1 & \alpha f_1 & c_1 \\ 0 & f_2 & c_2 \\ 0 & 0 & 1 \end{bmatrix} \quad (2)$$

Another approach of setting the ROI can include using computer vision techniques from depth maps. Surveillance systems typically comprise multiple cameras with fields of view that often overlap. Coarse depth maps of the scene being monitored can be estimated by exploiting these overlaps utilizing well-known stereo vision techniques which determine correspondences of salient points across multiple views. While typical stereo systems in which the baseline or separation between the cameras is known are capable of obtaining absolute measures of depth, in this application relative depth values may generally be sufficient. For areas of the area being monitored where overlapping fields of view are not available, techniques for depth estimation from monocular data such as shape from shading and depth from focus/defocus can be used.

Figure 5A:
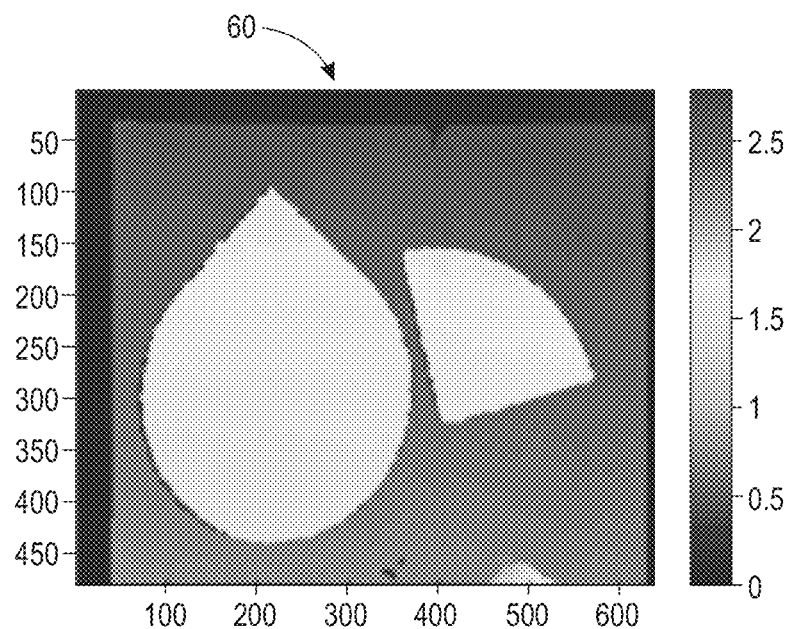
FIG. 5A is a height map generated from an image frame wherein elevated surfaces are readily identified.
Figure 5B:
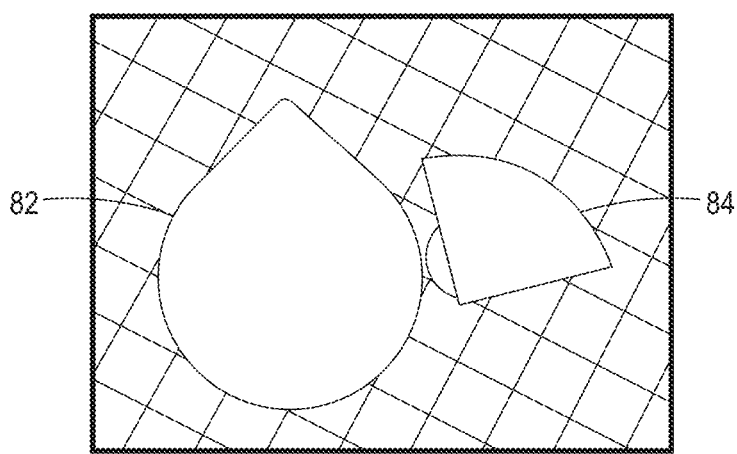
FIG. 5B is the image frame from which the height map of FIG. 5A is generated.
Figure 5C:
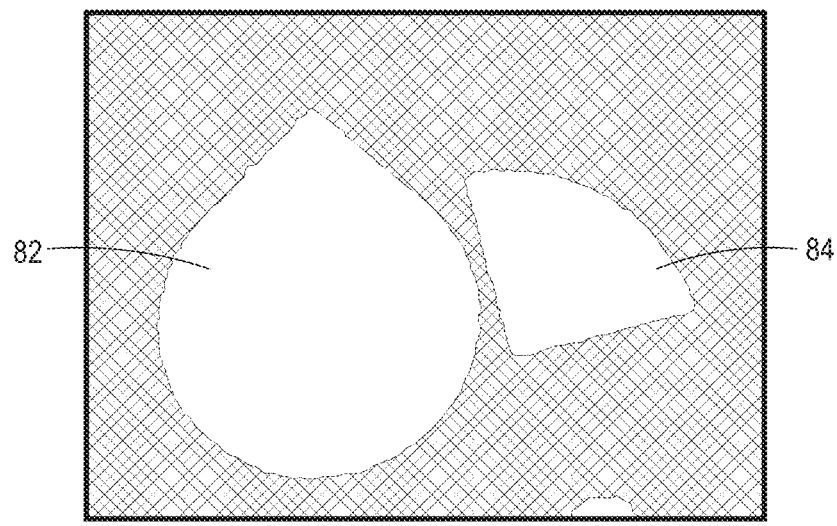
FIG. 5C is an illustration of the segmentation from height and color data from the image of FIG. 5A.

For example, FIG. 5A illustrates an uncalibrated height map 60 of the scene from FIG. 5B. Segmentation of the image from color and height information gives a clear indication of the location of the tables 82 and 84, as illustrated in FIG. 5C, where a mean shift segmentation algorithm was applied. Other segmentation algorithms such as region growth or watershed can be applied, either on the height map or on the combined color and height data.

The segmentation procedure illustrated in FIGS. 5A-5C assumes that a height map of the scene is available, which may not always be the case, particularly when cameras are not looking at the scene from the top. When oblique views rather than top views of the scene are available, such as in FIGS. 6A and 6B, depth maps relative to the optical axes of the cameras can be estimated. These can then be converted to height maps by applying a homographic or perspective transformation that depends on the camera pose. Details on computing the parameters of such transformation are set forth above.

In a simple installation scenario where both camera field of view and configuration of a restaurant are fixed after installation, the system would only generally need to run the ROI locator module once. In such case, the cost (computation or human labor) and efficiency (time needed to identify all ROIs) of running this module is not generally critical.

However, in restaurants where tables may be rearranged (for example, to temporarily satisfy atypical customer group sizes) the cost and efficiency of running the ROI locator module is more significant. In this scenario, the ROI locator module would preferably use a mix of techniques such as an initial manual identification, followed by a fine tuning process over time via computer vision techniques or object tracking techniques described herein. This would allow the module to meet the real-time requirement for this typical scenario without loss of accuracy.

Once the pixel coordinates of the ROI have been defined or detected by the ROI locator module 12, monitoring is carried out for at least one of (i) presence of items in the ROI and/or (ii) sustained presence or absence of motion in and around the ROI.

Presence of items in the ROI can be established, for instance, by comparing a current video frame containing extraneous objects with a reference frame with no such objects. For example, subtraction of a reference frame of the ROI with no objects/clutter from a current video frame followed by thresholding and morphological operations would give indication of presence or absence of foreground objects, which may include clutter as well as people. Extended stationarity of foreground objects would indicate presence of clutter, while dynamicity of foreground indicates presence of people. This process is computationally simple and robust for indoor operation since lighting conditions are controlled, as opposed to outdoor scenarios where changing conditions can present more challenges. For effective application of background subtraction operations, the background should be updated whenever the ROI changes locations (e.g., when tables at a restaurant are rearranged).

Other alternatives for implementing item detection in the ROI include comparing textural (LBP descriptors), frequency (FFT, DCT domains), multi-resolution (wavelet domain) and other feature set (SIFT, SURF, MSER, etc.) representations of the reference frame of the ROI with like representations of current frames. Features in the current frame representation not present in the reference frame representation would indicate presence of items in the ROI. When the ROI is expected to move, the reference frame representation should be updated accordingly. When updates of the reference frame representation are not available, correlations or similarity measurements between the reference representation and the current representation around a local spatial (or projective) neighborhood can be computed.

Computer vision algorithms for object detection trained on objects that can constitute clutter or relocated objects (cups, trays, boxes, bags, napkins, straws, stirrers, condiment packs, etc.) can alternatively be performed on the ROI. While more computationally expensive, one advantage of this approach is that it does not require storing a reference representation of the ROI, as opposed to the previously described techniques.

Furthermore, this additional information can be useful for the notifier module. For example, if objects such as keys, wallets, bags, hats, glasses, etc. are detected rather than cups, napkins, plastic utensils, etc., it may indicate that the customers have not yet left or more importantly the customers may have left their personal items unintentionally. In the latter case, the notifier module 18 may choose to alert the restaurant staff to reach out to the customers (e.g., broadcasting information to the customer, for example via a PA system).

Motion in and around the ROI typically indicates presence of people. Detection of motion can be performed by detecting changes in the characteristics of the identified foreground objects. Alternatively, detection of motion via frame differencing can also be effective, and is simpler than detection of foreground objects from background subtraction methods as no reference representations of the ROI need to be computed and stored.

At any given moment, an ROI corresponding to a dining table (or any ROI being monitored) can be in one of at least three states:

Normal state, for example, if there is no need for action (e.g., cleaning). The ROI is in this state whenever (i) no foreground objects are detected, or (i) sustained motion in and around the ROI is detected, regardless of the presence or absence of foreground objects.

Potential action state, if there is a potential need for action. The ROI is in this state whenever foreground objects are detected in the ROI. The ROI will transition to normal if sustained motion is detected within a predetermined time interval T, and to Action State otherwise.

Action state, if action is required, as evidenced by presence of foreground objects and sustained absence of motion in the ROI.

The ROI state determination module 18 determines the status of the ROI being monitored and communicates the need for issuing a notification to the notifier module 20 whenever the ROI is deemed to be in the Action State.

The notifier module 20 issues a notification to the restaurant employees when an empty table is deemed to be cluttered by ROI monitoring module 16. Alternatively, it can also issue notifications when the ROI is determined to be in the potential action cleaning state.

Figure 6A:
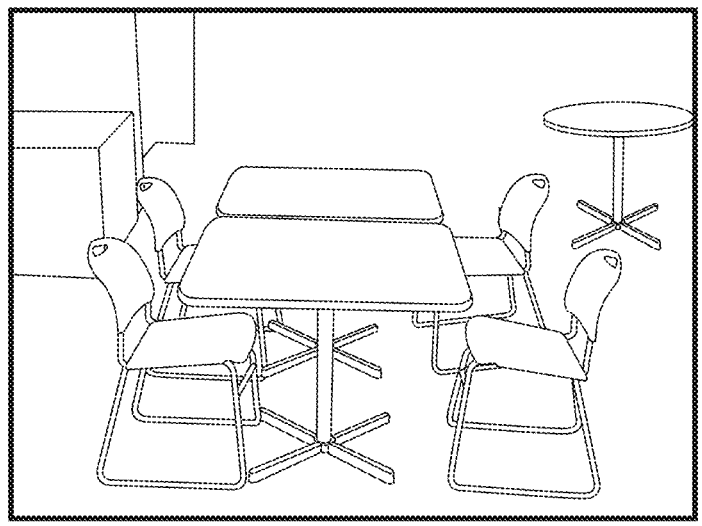
FIGS. 6A and 6B illustrate a sample image frame and a region of interest identified therein, respectively.
Figure 6B:
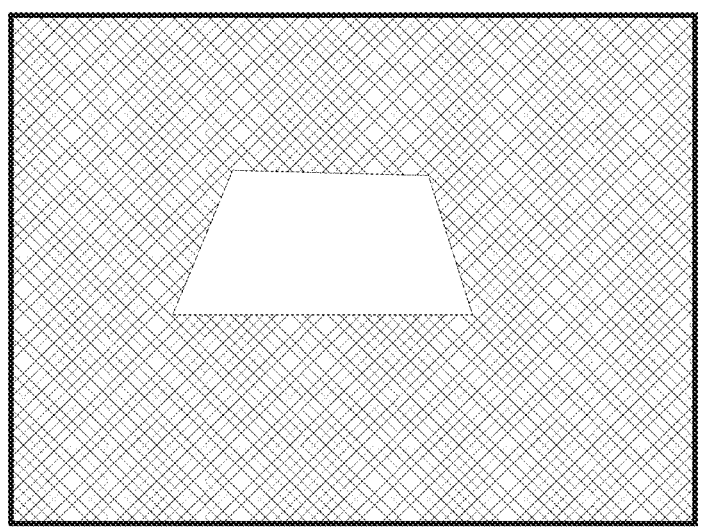

The algorithm set forth in the present disclosure has been applied to simulation video acquired in a dining room. FIG. 6A illustrates a sample frame of the acquired video along with the identified ROI in FIG. 6B, which was input manually.

Figure 7A:
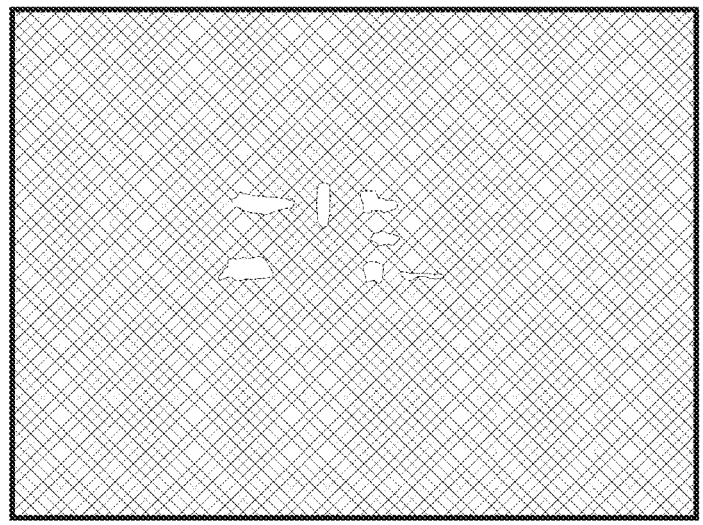
FIGS. 7A and 7B illustrate a sample output of region of interest (ROI) monitoring module in accordance with the present disclosure, and an image frame from which said output is generated, respectively.
Figure 7B:
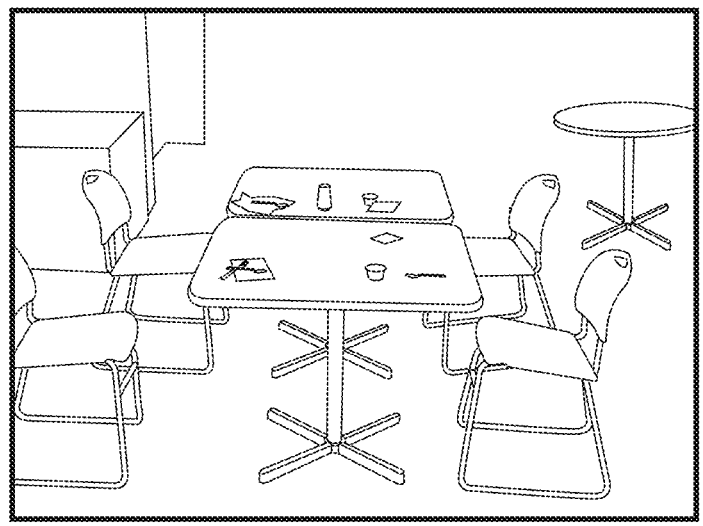

Four participants were asked to sit at the table with various utensils and to recreate two scenarios, one where utensils were left behind for an extended period of time (beyond T=10 seconds) and one where no clutter was left on the table. FIG. 7A shows a sample output of the ROI monitoring module where foreground objects O have been detected. FIG. 7B illustrates an image frame that was used to generate the sample output of FIG. 7A. A timer was triggered whenever absence of motion in and around the ROI was detected. A notification is triggered when the timer reached threshold T (in this example, 10 seconds).

Figure 8A:
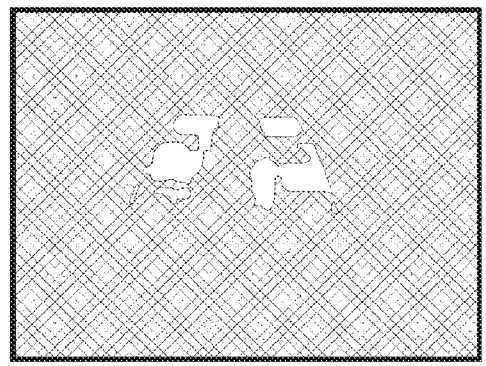
FIGS. 8A-8I illustrate the operation of an exemplary system in accordance with the present disclosure.
Figure 8B:
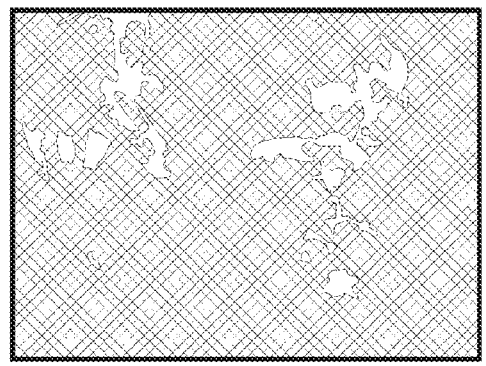
Figure 8C:
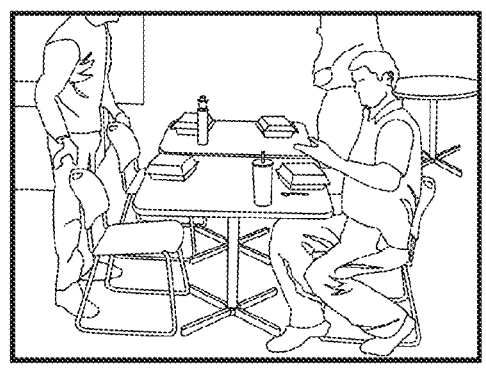
Figure 8D:
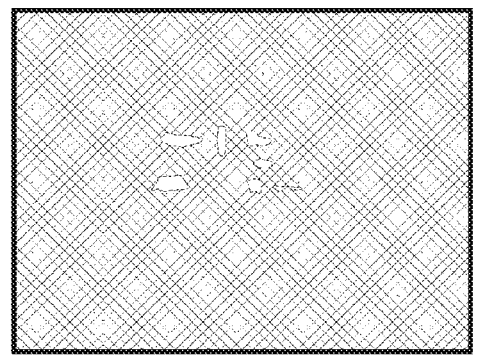
Figure 8E:
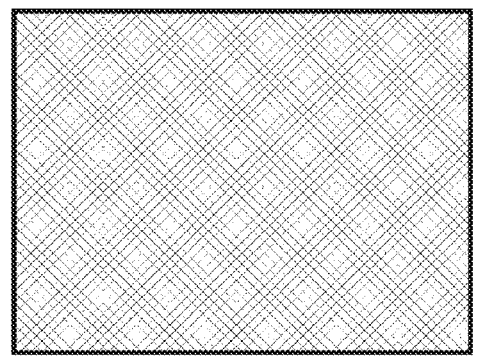
Figure 8F:
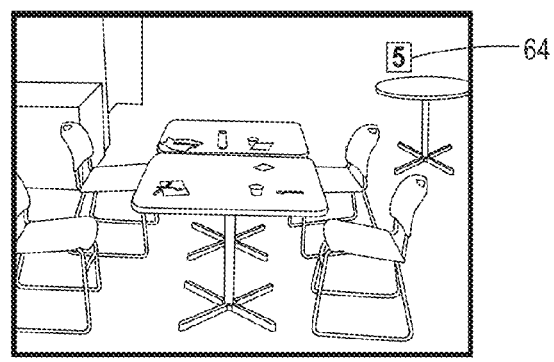
Figure 8G:
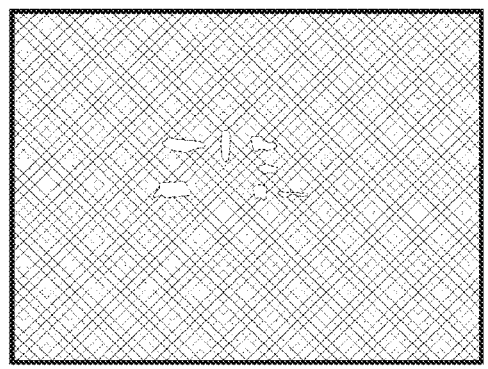
Figure 8H:
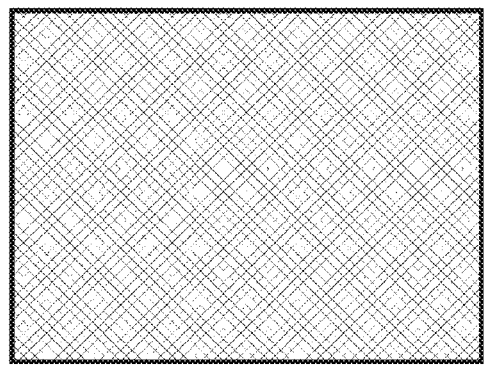
Figure 8I:
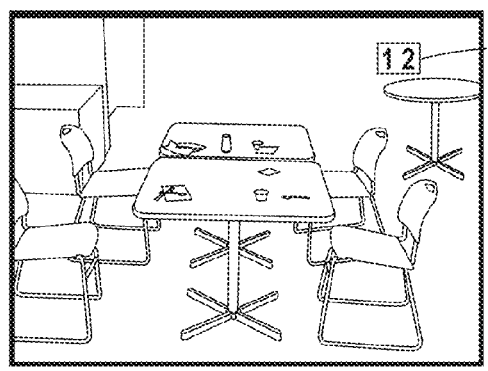

FIGS. 8A-8I illustrate the joint operation of the ROI state determination and notifier modules 18 and 20. The binary masks in FIGS. 8A, 8D and 8G correspond to the foreground object detection output, while the masks in FIGS. 8B, 8E and 8H correspond to the motion detection mask. The images in FIGS. 8C, 8F and 8I are the corresponding video frames.

The images in FIGS. 8A-8C correspond to a system in a normal state: although foreground objects were detected in the ROI in FIG. 8A, there is motion detected in and around the ROI according to FIG. 8B. No timer is displayed in FIG. 8C, which indicates a normal status.

The images in FIGS. 8D-8F correspond to a system in the potential action state: foreground objects are detected according to FIG. 8D and no motion is detected according to FIG. 8E. The time elapsed according to the timer 64 in the upper right hand corner of FIG. 8F indicates that no sustained motion has been detected for 5 seconds, which indicates a potential action status.

The images in FIGS. 8G-8I correspond to a system in the action state. The time elapsed according to the timer 64 in the upper right hand corner of FIG. 8I indicates that no sustained motion has been detected for 12 seconds, and since the threshold for the potential cleaning state to cleaning state transition to occur was set to 10, a notification has been issued as denoted by the different color scheme in the displayed timer 64 (shown as inverted here).

It will be appreciated that aspects of the present disclosure are intended to be implemented from video and images captured preferably from top views, as is often the case for surveillance cameras in restaurants. When only oblique views of the scene of interest are available, additional intelligence may be needed to separate traffic of passers-by vs. motion in and around the ROI, particularly for tables that are located near heavy traffic areas. This can be achieved by engaging multi-view capabilities of the system, if available. Alternatively, specific patterns of motion can be identified (e.g. motion across the scene vs. localized motion) to eliminate the undesired effect of passers-by.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of monitoring a customer space comprising:
   obtaining visual data comprising image frames of the customer space over a period of time;
   periodically defining a region of interest within the customer space using computer vision techniques to locate an elevated surface that is movable to different locations within the customer space;
   monitoring the region of interest for at least one predefined clutter condition; and
   generating a notification when the at least one predefined clutter condition is detected;
   wherein the region of interest corresponds to a portion of the customer space in which customers relocate objects, and wherein the predefined clutter condition includes detecting a presence of relocated objects in the region of interest.

2. The method of claim 1, wherein the detecting a presence of relocated objects includes estimating the appearance of a background space and detecting the appearance of foreground objects.

3. The method of claim 1, wherein the detecting a presence of relocated objects includes analyzing the visual data with an object detection algorithm configured to identify specific objects within the region of interest.

4. The method of claim 3, wherein the object detection algorithm is configured to detect objects including at least one of dining objects, litter, spills and personal accessories.

5. The method of claim 1, wherein the predefined clutter condition includes the presence of relocated objects in the region of interest and the absence of motion in the region of interest for a prescribed period of time.

6. The method of claim 5, wherein the prescribed period of time is at least ten seconds.

7. The method of claim 1, wherein the obtaining visual data includes recording images with a camera.

8. The method of claim 1, wherein the defining a region of interest is performed manually by selecting the region of interest in a video frame with an input device.

9. The method of claim 1, wherein the computer vision techniques include at least one of sensing horizontal support surfaces or generating a depth map using stereo vision techniques.

10. A non-transitory computer-readable medium having stored thereon computer-executable instructions for monitoring a customer space, the instructions being executable by a processor and comprising:
   receiving visual data of the customer space over a period of time;
   periodically defining a region of interest within the customer space, the region of interest corresponding to a portion of the customer space in which customers periodically relocate objects;
   monitoring the region of interest for at least one predefined clutter condition; and
   generating a notification when the at least one predefined clutter condition is detected;
   wherein the predefined clutter condition includes detecting a presence of relocated objects in the region of interest; and
   wherein the periodically defining a region of interest within the customer space includes using computer vision techniques to locate an elevated surface that is movable to different locations within the customer space.

11. The non-transitory computer-readable medium as set forth in claim 10, wherein the predefined clutter condition further includes a sustained presence or absence of motion in the region of interest.

12. The non-transitory computer-readable medium as set forth in claim 11, wherein the detecting a presence of relocated objects includes defining a background space and detecting the appearance of foreground objects.

13. The non-transitory computer-readable medium as set forth in claim 11, wherein the detecting a presence of relocated objects includes analyzing the visual data with an object detection algorithm configured to identify specific objects within the region of interest.

14. The non-transitory computer-readable medium as set forth in claim 13, wherein the object detection algorithm is configured to detect objects including at least one of dining objects, litter, spills and personal accessories.

15. A system for monitoring a customer space comprising:
   at least one optical sensor for obtaining visual data corresponding to the customer space; and
   a central processing unit including a processor and a non-transitory computer-readable medium having stored thereon computer-executable instructions for monitoring a customer space executable by the processor, the instructions comprising:
   receiving visual data of the customer space over a period of time from the optical sensor;
   periodically defining a region of interest within the customer space using computer vision techniques to locate an elevated surface that is movable to different locations within the customer space, the region of interest corresponding to a portion of the customer space in which customers periodically relocate objects;
   monitoring the region of interest for at least one predefined clutter condition; and
   generating a notification when the at least one predefined clutter condition is detected;
   wherein the predefined clutter condition includes detecting a presence of relocated objects in the region of interest.

16. The system for monitoring a customer space as set forth in claim 15, wherein the predefined clutter condition further includes a sustained presence or absence of motion in the region of interest.

17. The system for monitoring a customer space as set forth in claim 15, wherein the detecting a presence of relocated objects includes analyzing the visual data with an object detection algorithm configured to identify specific objects within the region of interest.

* * * * *